US007384461B2

(12) United States Patent
Kawai et al.

(10) Patent No.: US 7,384,461 B2
(45) Date of Patent: *Jun. 10, 2008

(54) WATER-BASED INK SET FOR INK-JET RECORDING AND INK-JET RECORDING METHOD

(75) Inventors: Narumi Kawai, Nagoya (JP); Narumi Koga, Nagoya (JP); Masaya Fujioka, Nagoya (JP); Ryuji Kato, Aisai (JP); Noriatsu Aoi, Ichinomiya (JP); Tomoyo Hamajima, Nagoya (JP); Shunichi Higashiyama, Yokkaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 127 days.

This patent is subject to a terminal disclaimer.

(21) Appl. No.: 11/313,174

(22) Filed: Dec. 20, 2005

(65) Prior Publication Data

US 2006/0132567 A1    Jun. 22, 2006

(30) Foreign Application Priority Data

Dec. 21, 2004    (JP)    ............................. 2004-370287
Dec. 21, 2004    (JP)    ............................. 2004-370288

(51) Int. Cl.
*C09D 11/02* (2006.01)
*B41J 2/01* (2006.01)

(52) U.S. Cl. .................. 106/31.27; 106/31.6; 347/100

(58) Field of Classification Search ............. 106/31.27, 106/31.6; 347/100
See application file for complete search history.

(56) References Cited

U.S. PATENT DOCUMENTS

| 6,843,840 B2 * | 1/2005 | Kataoka et al. ............. 106/31.6 |
| 7,188,943 B2 * | 3/2007 | Gondek et al. ............. 347/100 |
| 2005/0235867 A1 * | 10/2005 | Jackson et al. .......... 106/31.27 |
| 2005/0284329 A1 * | 12/2005 | Jackson et al. ............. 106/31.6 |
| 2006/0011095 A1 * | 1/2006 | Kabalnov et al. ......... 106/31.27 |
| 2006/0132810 A1 * | 6/2006 | Hamajima et al. ........... 358/1.9 |
| 2006/0238589 A1 * | 10/2006 | Koga et al. ................. 347/100 |
| 2006/0238590 A1 * | 10/2006 | Koga et al. ................. 347/100 |
| 2007/0046749 A1 * | 3/2007 | Kawai et al. ................ 347/100 |
| 2007/0046750 A1 * | 3/2007 | Kawai et al. ................ 347/100 |
| 2007/0046751 A1 * | 3/2007 | Hamajima et al. .......... 347/100 |
| 2007/0046752 A1 * | 3/2007 | Hamajima et al. .......... 347/100 |

FOREIGN PATENT DOCUMENTS

| JP | 1095093 | 4/1989 |
| JP | 2127482 | 5/1990 |

* cited by examiner

*Primary Examiner*—Helene Klemanski
(74) *Attorney, Agent, or Firm*—Reed Smith LLP

(57) ABSTRACT

The water-based ink set for ink-jet recording includes a cyan ink and a blue ink, or a cyan ink and a green ink. The cyan ink is a light cyan ink having a lightness (L*) of about 60 or more in the L*a*b* colorimetric system. A normal cyan ink having a lightness (L*) of about 60 or less in the L*a*b* calorimetric system is not included in the ink set.

28 Claims, 3 Drawing Sheets

L*=40

——— : Example 12

•••••••• : Comparative Example 10

L*=40

——— : Example 12

········ :Comparative Example 10

——— : Example 12

········ : Comparative Example 10

L*=60

——— : Example 12
········ : Comparative Example 10

L*=70

——— : Example 12
········ : Comparative Example 10

L*=80

—— : Example 12

·······  : Comparative Example 10

WATER-BASED INK SET FOR INK-JET RECORDING AND INK-JET RECORDING METHOD

BACKGROUND OF THE INVENTION

1. Field of the Invention

The present invention relates to a water-based ink set for ink-jet recording suitable for reducing graininess in a low density printed part and for extending a color reproduction range. The present invention also relates to an ink-jet recording method using this water-based ink set for ink-jet recording.

2. Description of the Related Art

When a color image is expressed by an ink-jet recording method, a three-color ink set has been generally used, composed of a yellow ink (Y), a magenta ink (M) and a cyan ink (C). Moreover, a four-color ink set has also been used in which a black ink (K) is further added to the standard three-color ink set.

Generally, in an ink-jet recording method, the gradation of an image is controlled by adjusting the density of dots formed by ejecting ink onto a recording material. However, when the gradation is controlled by such a method, the dot density decreases in a low density printed part. Relative to this, the individual dots become easily discernable to the eye, thereby causing the image to be grainy.

In view of the above, a method has been proposed in which two or more inks are employed as a cyan ink (Japanese Patent Application Laid-Open No. Hei 1-95093). In this method, these inks have different dye concentrations and are composed of different kinds of dyes. In addition, a dye which is excellent in vividness but inferior in light fastness is employed as a dark color ink, and a dye which is excellent in light fastness but inferior in vividness is employed as a light color ink. Moreover, a similar method has been proposed for a magenta ink (Japanese Patent Application Laid-Open No. Hei 2-127482). According to these methods, graininess can be improved, but a color reproduction range cannot be extended.

Generally, in a three-color ink set composed of yellow, magenta and cyan inks, and also in a four-color ink set in which a black ink is added to the three-color ink set, blue color is expressed by use of the cyan ink and the magenta ink, and green color is expressed by use of the cyan ink and the yellow ink. When these two inks are used to express blue color or green color as above, sharp printing quality and good color developing properties are difficult to achieve due to a landing error of superposition.

The present invention has been made to solve the above-mentioned problems. Objects of the present invention are, in an ink-jet recording method:

(i) to reduce graininess in a low density printed part containing cyan color without reducing a color reproduction range in a blue direction and/or a green direction, and a cyan direction in a high density printed part, and with minimizing the number of inks composing an ink set; and (ii) to extend the color reproduction range in the blue direction and/or the green direction to improve vividness.

The present inventors have conducted extensive studies on a water-based ink set for ink-jet recording. The studies are based on the hypothesis that the lightness (L*), the hue angle (h) and the chroma (C*) of the inks constituting the ink set are closely related to reducing graininess in a low density printed part of a color image and to extending the color reproduction range. Here, the lightness (L*), the hue angle (h) and the chroma (C*) are based on L*a*b* colorimetric system. Consequently, the present inventors have found that, in a water-based ink set for ink-jet recording having a cyan ink, the abovementioned objects (i) and (ii) can be achieved by employing a light cyan ink as the cyan ink and also employing a blue ink and/or a green ink. This light cyan ink has a lightness (L*) of a specific value or more and is employed in place of a normal cyan ink employed in a conventional ink set. Thus, the present invention has been completed.

Accordingly, the present invention provides a water-based ink set for ink-jet recording comprising a cyan ink and a blue ink. The ink set is characterized in that the cyan ink is a light cyan ink having a lightness (L*) of about 60 or more in the L*a*b* calorimetric system.

In another aspect, the present invention provides a water-based ink set for ink-jet recording comprising a cyan ink and a green ink. The ink set is characterized in that the cyan ink is a light cyan ink having a lightness (L*) of about 60 or more in the L*a*b* calorimetric system.

In addition, the present invention provides an ink-jet recording method employing any of the above-mentioned water-based ink sets for ink-jet recording.

The water-based ink set for ink-jet recording of the present invention comprises a light cyan ink having a low coloring agent concentration as a cyan ink. Therefore, when ink-jet recording is performed using this ink set, graininess can be reduced in a low density printed part containing cyan color.

Further, in another aspect, the ink set of the present invention comprises a blue ink in addition to the light cyan ink. Therefore, a color reproduction range in a cyan direction is not reduced in a high density printed part, and the color reproduction range in a blue direction is significantly extended, and the vividness of blue color is improved. The improvement of the vividness of blue color is achieved since blue color is not expressed by color mixing of a cyan ink and a magenta ink but can be expressed by the blue ink alone.

Further, according to the ink set of the present invention, the following effects can be achieved by use of the two inks, i.e., the light cyan ink and the blue ink: the reduction of graininess in a low density printed part containing cyan color; the prevention of the reduction of the color reproduction range of cyan color in a high density printed part; the significant extension of the color reproduction range in the blue direction; and the improvement of the vividness of blue color.

The ink set of the present invention in one aspect comprises a green ink in addition to the abovementioned light cyan ink. In this aspect, the color reproduction range in a cyan direction is not reduced in a high density printed part. In this case, the color reproduction range in a green direction is significantly extended, thereby improving the vividness of the green color. Incidentally, the improvement of the vividness of green color is not expressed by color mixing of a cyan ink and a yellow ink but can be expressed by the green ink alone.

Further, according to the ink set of the present invention, the following effects can be achieved by use of the two inks, i.e., the light cyan ink and the green ink: the reduction of graininess in a low density printed part containing cyan color; the prevention of the reduction of the color reproduction range of cyan color in a high density printed part; the significant extension of the color reproduction range in the green direction; and the improvement of the vividness of green color.

The ink set of the present invention in one aspect comprises a light cyan ink, a blue ink and a green ink. In this aspect, the color reproduction range in a blue direction as well as in a green direction is significantly extended, thereby improving the vividness of the blue color printed by use of the blue ink alone as well as the vividness of the green color printed by use of the green ink alone.

Therefore, according to the ink set of the present invention, the color reproducibility and the print quality of a color image formed by an ink-jet recording method can be improved.

Generally, blue color is the third most frequently used color in text printing next to black color and red color. Green color is also generally used in text printing. According to the present invention, the text in blue or green color is not printed by superposing two inks but can be printed by use of the blue ink alone or green ink alone. Therefore, sharp print quality can be achieved in which feathering is suppressed, and good color developing properties can also be obtained.

DETAILED DESCRIPTION OF THE INVENTION

Figure 1:
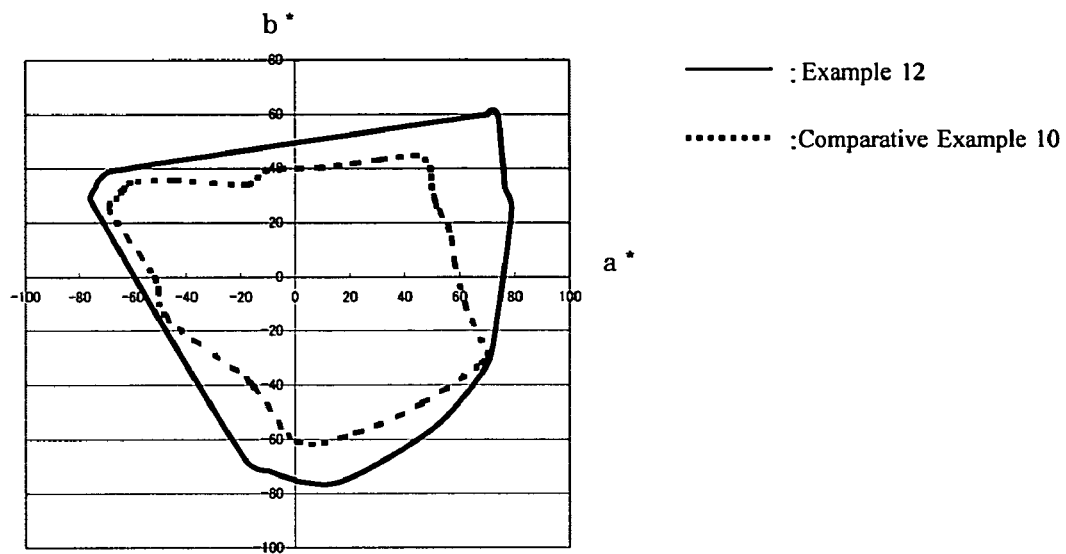
FIG. 1 is a graph showing a color reproduction range at lightness L*=40 for Example 12 and Comparative Example 10.

The present invention will now be described in detail.

In the present invention, lightness (L*), hue angle (h) and chroma (C*) are based on the L*a*b* calorimetric system standardized by the Commission Internationale de l'Eclairage (CIE) in 1976. This calorimetric system is also defined in Japanese Industrial Standards (JIS Z 8729).

In the present invention, the lightness (L*) is a lightness value in an object solidly printed at a resolution of 1,200× 1,200 dpi with an ink on glossy paper and is obtained by means of a spectrocolorimeter or a similar apparatus. Also, with respect to the hue angle (h) and the chroma (C*) in the same solidly printed object, first, color indices (a* and b*) are obtained by means of a spectrocolorimeter or a similar apparatus, and the hue angle (h) and the chroma (C*) are calculated from the following equations (1) and (2) using the obtained a* and b*.

$$C^* = \sqrt{(a^*)^2 + (b^*)^2} \quad \text{Equation (1)}$$

$$h = \tan^{-1}\left(\frac{b^*}{a^*}\right) \quad \text{(when } a^* \geq 0 \text{ and } b^* \geq 0\text{)} \quad \text{Equation (2)}$$

$$h = 360 + \tan^{-1}\left(\frac{b^*}{a^*}\right) \quad \text{(when } a^* \geq 0 \text{ and } b^* < 0\text{)}$$

$$h = 180 + \tan^{-1}\left(\frac{b^*}{a^*}\right) \quad \text{(when } a^* < 0\text{)}$$

The term of "glossy paper" employed in the measurement of the L*, a* and b* values refers to paper having a coat layer for surface smoothness provided on base paper (body paper). Specific examples of the glossy paper include KASSAI (a registered trade mark) glossy finishing (product of FUJI Photo Film Co., Ltd.), ink-jet printer paper (glossy paper, product of KOKUYO Co., Ltd.) and thick glossy paper (product of Kodak Co., Ltd.). The term "object solidly printed at a resolution of 1,200×1,200 dpi" refers to an area which is printed at a resolution of 1,200×1,200 dpi so as to be fully covered with ink. An ink-jet printer is employed for printing, and examples of the ink-jet printer include a digital multifunction device equipped with an ink-jet printer (MFC-5200J, product of Brother Industries, Ltd.) and the like. Examples of the spectrocolorimeter which can be used include Spectrolino (product of Gretag Macbeth) and the like. The measurement is performed by use of a light source $D_{65}$ at a viewing angle of 2°.

The water-based ink set for ink-jet recording of the present invention comprises at least a cyan ink and a blue ink, and is characterized in that the cyan ink is a light cyan ink having a lightness L* of about 60 or more. Alternatively, the water-based ink set for ink-jet recording of the present invention comprises at least a cyan ink and a green ink, and is characterized in that the cyan ink is a light cyan ink having a lightness L* of about 60 or more. Therefore, a normal cyan ink having a lightness L* of about 60 or less is not included in the ink set of the present invention. If this normal cyan ink having a lightness L* of less than about 60 is employed as the cyan ink, graininess is noticeable in a low density printed part containing cyan color. Thus, this normal cyan ink is not preferable as the cyan ink.

Preferably, the light cyan ink constituting the ink set of the present invention has a lightness L* in the range of from about 60 to about 85. The light cyan ink having a lightness L* exceeding about 85 is not preferable since, in this case, the original cyan color is difficult to reproduce.

Preferably, the hue angle h of the light cyan ink is adjusted within the range of from about 215° to about 255°. If the hue angle h is not in this range, cyan color is not satisfactorily expressed.

Further, preferably, the chroma C* of the light cyan ink is adjusted within the range of from about 40 to about 70. By adjusting the chroma C* within the above range, cyan color can be reproduced vividly.

Preferably, the blue ink constituting the ink set of the present invention has a lightness L* of about 45 or less. If the lightness L* of the blue ink exceeds about 45, the obtained color reproducibility range is not satisfactory in a blue direction. More preferably, the lightness L* of the blue ink falls within the range of from about 35 to about 45. By adjusting the lightness L* of the blue ink within the above range, blue and cyan colors can be reproduced at a satisfactory density.

Preferably, the hue angle h of the blue ink is adjusted within the range of from about 270° to about 285°. If the hue angle h is adjusted within the range, blue color is satisfactorily expressed.

Further, preferably, the chroma C* of the blue ink is adjusted within the range of from about 70 to about 80. By adjusting the chroma C* within the above range, blue color can be reproduced vividly.

Preferably, the green ink constituting the ink set of the present invention has a lightness L* of about 60 or less. The green ink having a lightness L* exceeding about 60 is not preferable since, in this case, the original green color is difficult to reproduce. More preferably, the lightness L* of the green ink falls within the range of from about 35 to about 60. By adjusting the lightness L* of the green ink within the above range, green and cyan colors can be reproduced at a satisfactory density.

Preferably, the hue angle h of the green ink is adjusted within the range of from about 175° to less than about 215°. If the hue angle h is adjusted within the range, green color is satisfactorily expressed.

Further, preferably, the chroma C* of the green ink is adjusted within the range of from about 60 to about 80. By adjusting the chroma C* within the above range, green color can be reproduced vividly.

If both the blue ink and the green ink are included together with the light cyan ink in the ink set of the present invention, the blue ink and the green ink described above may preferably be used.

The ink set of the present invention may include any ink in addition to the above-described light cyan ink and the blue ink and/or the green ink. For example, a yellow ink and/or a magenta ink may be included in the ink set. A black ink may be included in accordance with need. A full color image can be reproduced by including a yellow ink, a magenta ink, and, if necessary, a black ink in addition to the above-described light cyan ink, and a blue ink or a green ink.

If a magenta ink is included in the ink set of the present invention, a normal magenta ink employed in a known ink set can also be employed. However, preferably, a light magenta ink having a lightness $L^*$ of about 50 or more is employed in place of the normal magenta ink, and a red ink is also employed. In this case, the normal magenta ink having a lightness $L^*$ of about 50 or less is unnecessary. By employing the light magenta ink having a lightness $L^*$ of about 50 or more as the magenta ink, graininess can be reduced in a low density printed part containing magenta color. Preferably, the lightness $L^*$ of the light magenta ink falls within the range of from about 50 to about 65. The light magenta ink having a lightness $L^*$ exceeding about 65 is not preferable since, in this case, the original magenta color is difficult to reproduce.

Preferably, the hue angle h of the light magenta ink is adjusted within the range of from about 335° to about 360° or within the range of from about 0° to about 5°. If the hue angle h is not in any of these ranges, magenta color is not satisfactorily expressed.

Further, preferably, the chroma $C^*$ of the light magenta ink is adjusted within the range of from about 80 to about 90. By adjusting the chroma $C^*$ within the above range, magenta color can be reproduced vividly.

Preferably, the red ink constituting the ink set of the present invention together with the above-mentioned light magenta ink has a lightness $L^*$ of about 50 or less. If the lightness $L^*$ of the red ink exceeds about 50, it is difficult to obtain a sufficient color reproduction range in the red direction. More preferably, the lightness $L^*$ of the red ink falls within the range of from about 25 to about 50. By adjusting the lightness $L^*$ of the red ink within the above range, red and magenta colors can be reproduced at a satisfactory density.

Preferably, the hue angle h of the red ink is adjusted within the range of from about 20° to about 35°. If the hue angle h is adjusted within the range, red color is satisfactorily expressed.

Further, preferably, the chroma $C^*$ of the red ink is adjusted within the range of from about 80 to about 90. By adjusting the chroma $C^*$ within the above range, red color can be reproduced vividly.

If a yellow ink or a black ink is included in the ink set of the present invention, an ink employed in a publicly known ink set may be employed as these inks. For example, a normal yellow ink having a hue angle h of from about 70° to about 140° may be employed as the yellow ink.

Each of the inks constituting the ink set of the present invention contains a coloring agent, water and a water soluble organic solvent so as to have $L^*$, h and $C^*$ of the respective predetermined values described above.

Water soluble dye and/or pigment may be employed as the coloring agent contained in each of the inks. A proper combination of water soluble dye and pigment may be employed to adjust the inks to have the predetermined color.

Representative examples of the water soluble dye employed include direct dyes, acid dyes, basic dyes and reactive dyes. Also, examples of the preferable water soluble dye include azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like. Particularly, examples of the water soluble dye which is suitable as the ink of an ink-jet recording method and satisfies the required properties such as vividness, water solubility, stability, and light fastness include: direct dyes such as C. I. Direct Yellows 12, 24, 26, 27, 28, 33, 39, 58, 86, 98, 100, 132 and 142, C. I. Direct Reds 4, 17, 28, 37, 63, 75, 79, 80, 81, 83 and 254, C. I. Direct Violets 47, 48, 51, 90 and 94, C. I. Direct Blues 1, 6, 8, 15, 22, 25, 71, 76, 80, 86, 87, 90, 106, 108, 123, 163, 165, 199 and 226, C. I. Direct Greens 1, 26, 28, 59, 80 and 85, and the like; acid dyes such as C. I. Acid Yellows 3, 11, 17, 19, 23, 25, 29, 38, 42, 49, 59, 61, 71 and 72, C. I. Acid Reds 1, 6, 8, 18, 32, 35, 37, 42, 52, 85, 88, 115, 133, 134, 154, 186, 249, 289 and 407, C. I. Acid Violets 10, 34, 49 and 75, C. I. Acid Blues 9, 22, 29, 40, 59, 62, 93, 102, 104, 112, 113, 117, 120, 167, 175, 183, 229 and 234, C. I. Acid Greens 3, 5, 9, 12, 15, 16, 19, 25, 27, 28, 36, 40, 41, 43, 44, 56, 73, 81, 84, 104, 108 and 109, and the like; basic dyes such as C. I. Basic Yellow 40, C. I. Basic Reds 9, 12 and 13, C. I. Basic Violets 7, 14 and 27, C. I. Basic Blues 1, 3, 5, 7, 9, 24, 25, 26, 28 and 29, C. I. Basic Greens 1 and 4, and the like; reactive dyes such as C. I. Reactive Yellow 2, C. I. Reactive Reds 4, 23, 24, 31 and 56, C. I. Reactive Blues 7, 13 and 49, C. I. Reactive Greens 5, 6, 7, 8, 12, 15, 19 and 21, and the like.

In addition, examples of the pigment include C. I. Pigment Yellows 1, 2, 3, 13, 16, 74, 83, 93, 128, 134 and 144, C. I. Pigment Reds 5, 7, 12, 23, 48 (Mn), 57 (Ca), 112, 122, 144, 170, 177, 221, 254 and 264, C. I. Pigment Violets 19 and 48 (Ca), C. I. Pigment Blues 1, 2, 3, 15, 15:1, 15:2, 15:3, 15:4, 15:5, 15:6, 16, 17:1, 22, 27, 28, 29, 36 and 60, C. I. Pigment Green 7, and the like.

Water soluble dye and/or pigment may be employed as the coloring agent of the black ink, and a proper combination thereof may also be employed. Examples of the water soluble dye include: direct dyes such as C. I. Direct Blacks 17, 19, 32, 51, 71, 108, 146, 154 and 168; acid dyes such as C. I. Acid Blacks 2, 7, 24, 26, 31, 52, 63, 112 and 118; basic dyes such as C. I. Basic Black 2, C. I. Food Blacks 1 and 2; and the like. Examples of the pigment which can be employed include carbon blacks such as MA8, MA100 (products of Mitsubishi Chemical Corporation) and color black FW200 (product of Degussa). A self-dispersing type carbon black which can disperse in water without using a dispersing agent may be employed as the carbon black. A self-dispersing type carbon black can be obtained by subjecting a carbon black to a surface treatment such that at least one hydrophilic group such as a carbonyl group, a carboxyl group, a hydroxyl group, a sulfone group or a salt thereof is bound to the surface of the carbon black. Specific examples of the surface treatment include a method disclosed in Japanese Patent Application Laid-Open No. Hei 8-3498 (corresponding to U.S. Pat. No. 5,609,671) and a method disclosed in Published Japanese translation of PCT International Application No. 2000-513396 (corresponding to WO97/48769). Alternatively, a commercial product such as CAB-O-JET (a registered trade mark) 200, 300 (products of Cabot Corporation) or BONJET (a registered trade mark) CW1 (product of Orient Chemical Industries, Ltd.) may be employed as the self-dispersing black pigment.

The preferable content of the water soluble dye contained in each of the inks depends on the desired printing density and the desired color. If the content is too low, the color is not satisfactorily developed on a recording material. If the content is too high, a nozzle of an ink-jet head tends to be clogged. Thus, the content of the water soluble dye with respect to the total amount of the corresponding ink is preferably about 0.1 to about 15 wt. %, more preferably about 0.3 to about 10 wt. % and particularly preferably about 0.5 to about 5.0 wt. %.

The preferable content of the pigment contained in each of the inks depends on the desired printing density and the desired color. If the content is too low, the color is not satisfactorily developed on a recording material. If the content is too high, a nozzle of an ink-jet head tends to be clogged. Thus, the content of the pigment with respect to the total amount of the corresponding ink is preferably about 1 to about 15 wt. % and more preferably about 1 to about 10 wt. %.

Preferably, the water employed in each of the inks is deionized water. The content of the water is determined based on the kind of the water soluble organic solvent, the composition of the ink and the desired ink properties. If the content of the water is too low, the viscosity of the ink increases to cause difficulty in ejecting the ink from a nozzle of an ink-jet head. If the content is too high, the coloring agent is precipitated or aggregated due to the evaporation of water, and thus a nozzle of an ink-jet head tends to be clogged. Therefore, the content of the water with respect to the total amount of the corresponding ink is preferably about 10 to about 95 wt. %, more preferably about 10 to about 75 wt. % and particularly preferably about 20 to about 75 wt. %.

The water soluble organic solvents employed in each of the inks are broadly categorized into a humectant and a penetrant.

The humectant is added to the ink for preventing clogging of a nozzle of an ink-jet head. Specific examples of the humectant include water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like. If the content of the water soluble organic solvent serving as the humectant is too low, the clogging of a nozzle of an ink-jet head is not satisfactorily prevented. If the content is too high, the viscosity of the ink increases to cause difficulty in ejecting. Therefore, the content of the water soluble organic solvent with respect to the total amount of the corresponding ink is preferably about 5 to about 50 wt. %, more preferably about 5 to about 40 wt. % and particularly preferably about 5 to about 35 wt. %.

The penetrant is added to the ink for allowing the ink to rapidly penetrate into recording paper upon printing. Specific examples of the penetrant include glycol ethers typified by ethylene glycol-based and propylene glycol-based alkyl ethers. Specific examples of the ethylene glycol-based alkyl ether include ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Specific examples of the propylene glycol-based alkyl ether include propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether and the like.

If the content of the water soluble organic solvent serving as the penetrant is too low, the penetrability is unsatisfactory. If the content is too high, the penetrability becomes excessively high, and thus bleeding such as feathering tends to occur. Therefore, the content of the water soluble organic solvent with respect to the total amount of the corresponding ink is preferably about 0.1 to about 10 wt. % and more preferably about 0.1 to about 5 wt. %.

Each of the inks constituting the ink set of the present invention may contain a water soluble organic solvent in addition to the above-described humectant and penetrant. The water soluble organic solvent prevents drying of ink at the tip of an ink-jet head, enhances printing density, and helps the development of vivid color. Examples of such water soluble organic solvent include: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; 2-pyrrolidone; N-methyl-2-pyrrolidone; 1,3-dimethyl-2-imidazolidinone; and the like.

Moreover, other conventionally known surfactants; viscosity modifiers such as polyvinyl alcohol, cellulose, water soluble resin and the like; surface tension modifiers, mildewproofing agents; or the like may be added to each of the inks constituting the ink set of the present invention in accordance with need.

The ink-jet recording method of the present invention performs ink-jet recording by use of the ink set of the present invention. No particular limitation is imposed on the type of the ink-jet recording method. Examples of the ink-jet recording method include an electrostatic suction method, a method using a piezoelectric element, a thermal method and the like.

EXAMPLES

The present invention will next be specifically described by way of Examples and Comparative Examples.

Examples 1 to 11, Comparative Examples 1 to 9

(1) Preparation of Inks

Light cyan ink 1 having the ink composition shown in Table 1 was prepared as follows.

First, 69 parts by weight of water, 27 parts by weight of glycerin and 2 parts by weight of dipropylene glycol-n-propyl ether were mixed to prepare 98 parts by weight of an ink solvent. Subsequently, 2 parts by weight of a cyan water soluble dye (C. I. Direct Blue 199) was added to 98 parts by weight of the ink solvent under stirring. The mixture was continued to stir for 30 minutes and filtrated with a membrane filter having a pore size of 1 μm to obtain light cyan ink 1.

The same procedure as in the case of light cyan ink 1 was repeated to prepare light cyan inks 2 and 3, a normal cyan ink, blue inks 1 and 2, green inks 1 and 2, a magenta ink and a yellow ink, except that the ink composition thereof was changed as shown in Table 1.

(2) Determination of L*, a*, b*, C* and h

Each of the inks was filled into a predetermined ink cartridge, and the ink cartridge was attached to a digital multifunction device equipped with an ink-jet printer (MFC-5200J, product of Brother Industries, Ltd.). Subsequently, an object was solidly printed at a resolution of 1,200×1,200 dpi on glossy paper (KASSAI (a registered trade mark) glossy finishing, product of FUJI Photo Film Co., Ltd.). The solidly printed object was measured for L*, a* and b* based on Spectrolino (product of Gretag Macbeth) (light source: $D_{65}$, viewing angle: 2°).

The values of C* and h were evaluated from the following equations (1) and (2) using the obtained measurement values.

The results are shown in Table 1.

$$C^* = \sqrt{(a^*)^2 + (b^*)^2} \qquad \text{Equation (1)}$$

$$h = \tan^{-1}\left(\frac{b^*}{a^*}\right) \qquad \text{(when } a^* \geq 0 \text{ and } b^* \geq 0\text{)} \qquad \text{Equation (2)}$$

$$h = 360 + \tan^{-1}\left(\frac{b^*}{a^*}\right) \qquad \text{(when } a^* \geq 0 \text{ and } b^* < 0\text{)}$$

$$h = 180 + \tan^{-1}\left(\frac{b^*}{a^*}\right) \qquad \text{(when } a^* < 0\text{)}$$

Subsequently, (a) graininess evaluation of cyan color, (b) evaluation of blue color reproducibility, (b') evaluation of green color reproducibility, (c) evaluation of cyan color reproducibility, and (d) overall evaluation were performed as follows.

(a) Graininess Evaluation of Cyan Color

For each of the gradation samples, the patch for L*=80 or 90 was visually observed, and the graininess of cyan color was evaluated by the following criteria. The evaluation results are shown in Table 2A (L*=80) and Table 2B (L*=90).

TABLE 1

| | | Light cyan ink 1 | Light cyan ink 2 | Light cyan ink 3 | Normal cyan ink | Blue ink 1 | Blue ink 2 | Green ink 1 | Green ink 2 | Magenta ink | Yellow ink |
|---|---|---|---|---|---|---|---|---|---|---|---|
| Ink composition (wt %) | C. I. Direct Blue 199 | 2.0 | 1.5 | 0.5 | 3.0 | — | — | — | — | — | — |
| | C. I. Reactive Blue 49 | — | — | — | — | 6.0 | — | — | — | — | — |
| | C. I. Acid Blue 112 | — | — | — | — | — | 6.0 | — | — | — | — |
| | C. I. Acid Green 3 | — | — | — | — | — | — | 6.0 | — | — | — |
| | C. I. Acid Green 15 | — | — | — | — | — | — | — | 6.0 | — | — |
| | C. I. Acid Red 289 | — | — | — | — | — | — | — | — | 1.5 | — |
| | C. I. Direct Yellow 86 | — | — | — | — | — | — | — | — | — | 0.4 |
| | C. I. Direct Yellow 132 | — | — | — | — | — | — | — | — | — | 1.6 |
| | Glycerin | 27.0 | 27.0 | 27.0 | 27.0 | 27.0 | 27.0 | 27.0 | 27.0 | 26.0 | 27.0 |
| | Dipropylene glycol-n-propyl ether | 2.0 | 2.0 | 2.0 | 2.0 | 2.0 | 2.0 | 2.0 | 2.0 | 2.0 | 2.0 |
| | Water | 69.0 | 69.5 | 70.5 | 68.0 | 65.0 | 65.0 | 65.0 | 65.0 | 70.5 | 69.0 |
| Colorimetric system | L* | 60 | 64 | 78 | 54 | 40 | 42 | 49 | 41 | — | — |
| | C* | 68 | 66 | 48 | 69 | 75 | 74 | 77 | 71 | — | — |
| | h [°] | 230 | 229 | 227 | 234 | 282 | 272 | 189 | 207 | — | — |

(3) Configuration of Ink Sets

The inks shown in Table 1 were combined as shown in Tables 2A and 2B to configure water-based ink sets for ink-jet recording. Each of Comparative Examples 1 and 7 corresponds to a conventional ink set.

(4) Evaluation of Ink Sets

For each of the ink sets shown in Tables 2A and 2B, the inks constituting the ink set were filled into predetermined ink cartridges, and the ink cartridges were attached to a digital multifunction device equipped with an ink-jet printer (MFC-5200J, product of Brother Industries, Ltd.). Subsequently, gradation samples for the light cyan ink and the normal cyan ink were printed for graininess evaluation on glossy paper (KASSAI (a registered trade mark) glossy finishing, product of FUJI Photo Film Co., Ltd.). In addition, print pattern samples containing patches having various hues were printed by changing the mixing ratio of the cyan ink (the light cyan ink and the normal cyan ink), the blue ink and the magenta ink for color reproducibility evaluation of blue and cyan colors. Furthermore, print pattern samples containing patches having various hues were printed by changing the mixing ratio of the cyan ink (the light cyan ink and the normal cyan ink), the green ink and the yellow ink for color reproducibility evaluation of green and cyan colors.

The patches of each of the printed samples were measured for a*, b* and L* by means of the same method as above.

A: Graininess is not found.
B: Graininess is almost unnoticeable.
C: Graininess is noticeable. Practically problematic.

(b) Evaluation of Blue Color Reproducibility (b-1) Visual Evaluation

Patches having a hue angle h of 277°±5° were selected from the abovementioned print pattern samples. Here, the above hue angle h corresponds to blue color. The selected blue color patches were visually observed to evaluate, by use of the following criteria, whether or not the blue color was satisfactorily expressed. The evaluation results are shown in Table 2A.

A: High density blue color is satisfactorily expressed.
B: High density blue color is expressed.
C: High density blue color is not satisfactorily expressed.

(b-2) Chroma (C*) and Chroma Difference (A)

Blue color patches having a hue angle h of 277°±5° and a lightness L* of 40±5 were selected from the abovementioned print pattern samples, and C* was evaluated for each of the selected patches from equation (1).

In addition, the chroma value C* of the patch (h=278°) of Comparative Example 1 was used as the comparison criterion to evaluate the chroma difference (A) from equation (3) below. The chroma difference (A) is the difference between the chroma value C*(corresponding to $C^*_2$ in Equation (3))

of each of the above patches and the chroma value C* (corresponding to $C^*_1$ in Equation (3)) of the patch of Comparative Example 1. The larger the chroma difference (A), the better the color reproducibility of high density blue color. The results are shown in Table 2A.

$$A = C^*_2 - C^*_1 \quad \text{Equation (3)}$$

(wherein $C^*_1$ is C* of comparative example 1, and $C^*_2$ is C* of example or comparative example)

(b') Evaluation of Green Color Reproducibility (b'-1) Visual Evaluation

Patches having a hue angle h of 200°±10° were selected from the abovementioned print pattern samples. Here, the above hue angle h corresponds to green color. The selected green color patches were visually observed to evaluate, by use of the following criteria, whether or not the green color was satisfactorily expressed. The evaluation results are shown in Table 2B.

A: High density green color is satisfactorily expressed.
B: High density green color is expressed.
C: High density green color is not satisfactorily expressed.

(b'-2) Chroma (C*) and Chroma Difference (A)

Green color patches having a hue angle h of 200°±10° and a lightness L* of 55±3 were selected from the abovementioned print pattern samples, and C* was evaluated for each of the selected patches from equation (1).

In addition, the chroma value C* of the patch (h=196°) of Comparative Example 7 was used as the comparison criterion to evaluate the chroma difference (A) from equation (3') below. The chroma difference (A) is the difference between the chroma value C*(corresponding to $C^*_2$ in Equation (3')) of each of the above patches and the chroma value C*(corresponding to $C^*_1$ in Equation (3')) of the patch of Comparative Example 7. The larger the chroma difference (A), the better the color reproducibility of high density green color. The results are shown in Table 2B.

$$A = C^*_2 - C^*_1 \quad \text{Equation (3')}$$

(wherein $C^*_1$ is C* of comparative example 7, and $C^*_2$ is C* of example or comparative example)

(c) Evaluation of Cyan Color Reproducibility (c-1) Visual Evaluation

Patches having a hue angle h of 234°±5° were selected from the abovementioned print pattern samples. Here, the above hue angle h corresponds to cyan color. The selected cyan color patches were visually observed to evaluate, by use of the following criteria, whether or not the cyan color was satisfactorily expressed. The evaluation results are shown in Tables 2A and 2B.

A: High density cyan color is satisfactorily expressed.
B: Colors close to high density cyan color are expressed.
C: High density cyan color is not satisfactorily expressed.

(c-2) Chroma (C*) and Lightness Difference (B)

A patch having a hue angle h of from 215° to 255° was selected from the above print pattern samples. When the hue angle h of a patch falls within the above range, the patch is categorized as a cyan color patch. The selection was made such that the selected patch had a lightness L* and a hue angle h closest to those of the cyan color patches (h=2340, L*=54, and h=234°, L*=54, respectively) of Comparative Examples 1 and 7. These patches of Comparative Examples 1 and 7 were printed by use of a conventional ink set. Subsequently, the chroma (C*) was determined for each patch by the foregoing equation (1).

The lightness difference (B) between the selected patch and the patch of Comparative Example 1 or 7 was calculated from equation (4). Here, the larger the lightness difference (B), the worse the color reproducibility of high density cyan color.

$$B = L^*_2 - L^*_1 \quad \text{Equation (4)}$$

(wherein $L^*_1$ is L* of comparative example 1 or 7, and $L^*_2$ is L* of example or comparative example)

(d) Overall Evaluation

Overall evaluation was conducted based on the results of (a) graininess evaluation of cyan color, (b) evaluation of blue color reproducibility, (b') evaluation of green color reproducibility, and (c) evaluation of cyan color reproducibility by use of the following criteria. The results are shown in Tables 2A and 2B.

G: All of the evaluation results are rank A or rank B.
NG: The evaluation results contain at least one rank C.

TABLE 2A

| | | Example 1 | Example 2 | Example 3 | Example 4 | Example 5 | Example 6 | Comparative Example 1 |
|---|---|---|---|---|---|---|---|---|
| Ink | Cyan ink | Light cyan ink 1 | Light cyan ink 2 | Light cyan ink 3 | Light cyan ink 1 | Light cyan ink 2 | Light cyan ink 3 | Normal cyan ink |
| | Blue ink | Blue ink 1 | Blue ink 1 | Blue ink 1 | Blue ink 2 | Blue ink 2 | Blue ink 2 | — |
| | Magenta ink | Magenta ink | Magenta ink | Magenta ink | Magenta ink | Magenta ink | Magenta ink | Magenta ink |
| Evaluation | Graininess of cyan color (L* = 80) | B | A | A | B | A | A | C |
| | Reproducibility of blue color — Visual evaluation | A | A | A | A | A | A | C |
| | L* | 40 | 40 | 40 | 42 | 42 | 42 | 42 |
| | C* | 75 | 75 | 75 | 74 | 74 | 74 | 60 |
| | h [°] | 282 | 282 | 282 | 272 | 272 | 272 | 278 |
| | Chroma difference (A) | +15 | +15 | +15 | +14 | +14 | +14 | Comparison criterion |

TABLE 2A-continued

|  |  |  |  |  |  |  |  |  |
|---|---|---|---|---|---|---|---|---|
| Reproducibility of cyan color | Visual evaluation | B | B | B | B | B | B | A |
|  | L* | 56 | 55 | 52 | 55 | 57 | 54 | 54 |
|  | C* | 66 | 65 | 40 | 69 | 67 | 67 | 69 |
|  | h [°] | 238 | 244 | 234 | 237 | 241 | 252 | 234 |
|  | Lightness difference (B) | +2 | +1 | −2 | +1 | +3 | ±0 | Comparison criterion |
| Overall evaluation |  | G | G | G | G | G | G | NG |

|  |  | Comparative Example 2 | Comparative Example 3 | Comparative Example 4 | Comparative Example 5 | Comparative Example 6 |
|---|---|---|---|---|---|---|
| Ink | Cyan ink | Normal cyan ink | Normal cyan ink | Light cyan ink 1 | Light cyan ink 2 | Light cyan ink 3 |
|  | Blue ink | Blue ink 1 | Blue ink 2 | — | — | — |
|  | Magenta ink | Magenta ink | Magenta ink | Magenta ink | Magenta ink | Magenta ink |
| Evaluation | Graininess of cyan color (L* = 80) | C | C | B | A | A |
| Reproducibility of blue color | Visual evaluation | A | A | C | C | C |
|  | L* | 40 | 42 | 39 | 39 | 70 |
|  | C* | 75 | 74 | 59 | 57 | 37 |
|  | h [°] | 282 | 272 | 275 | 277 | 274 |
|  | Chroma difference (A) | +15 | +14 | −1 | −3 | −23 |
| Reproducibility of cyan color | Visual evaluation | A | A | C | C | C |
|  | L* | 54 | 54 | 60 | 64 | 78 |
|  | C* | 69 | 69 | 68 | 66 | 48 |
|  | h [°] | 234 | 234 | 230 | 229 | 227 |
|  | Lightness difference (B) | ±0 | ±0 | +6 | +10 | +24 |
| Overall evaluation |  | NG | NG | NG | NG | NG |

TABLE 2B

|  |  | Example 7 | Example 8 | Example 9 | Example 10 | Example 11 | Comparative Example 7 | Comparative Example 8 | Comparative Example 9 |
|---|---|---|---|---|---|---|---|---|---|
| Ink | Cyan ink | Light cyan ink 1 | Light cyan ink 2 | Light cyan ink 3 | Light cyan ink 1 | Light cyan ink 2 | Normal cyan ink | Light cyan ink 1 | Light cyan ink 2 |
|  | Green ink | Green ink 1 | Green ink 1 | Green ink 1 | Green ink 2 | Green ink 2 | — | — | — |
|  | Yellow ink | Yellow ink | Yellow ink | Yellow ink | Yellow ink | Yellow ink | Yellow ink | Yellow ink | Yellow ink |
| Evaluation | Graininess of cyan color (L* = 90) | B | A | A | B | A | C | B | A |
| Reproducibility of green color | Visual evaluation | A | A | A | A | A | B | C | C |
|  | L* | 56 | 56 | 56 | 54 | 54 | 56 | *1 | *1 |
|  | C* | 71 | 71 | 71 | 72 | 72 | 68 | *1 | *1 |
|  | h [°] | 191 | 191 | 191 | 209 | 209 | 196 | — | — |
|  | Chroma difference (A) | 3 | 3 | 3 | 4 | 4 | Comparison criterion | — | — |
| Reproducibility of cyan color | Visual evaluation | B | B | B | B | B | A | C | C |
|  | L* | 56 | 56 | 57 | 55 | 55 | 54 | 60 | 64 |
|  | C* | 68 | 68 | 69 | 69 | 72 | 69 | 68 | 66 |
|  | h [°] | 228 | 221 | 213 | 223 | 215 | 234 | 230 | 229 |
|  | Lightness difference (B) | 2 | 2 | 3 | 1 | 1 | Comparison criterion | 6 | 10 |
| Overall evaluation |  | G | G | G | G | G | NG | NG | NG |

*1: Green color at L* = 55 ± 3 cannot be expressed.

As shown in Tables 2A and 2B, in each of Examples 1 to 11, the graininess was almost unnoticeable in a low density printed part (L*=80 or 90) of cyan color since the light cyan ink having a lightness L* of 60 or more was employed.

Further, in each of Examples 1 to 6, since the blue ink having a lightness L* of 45 or less was employed, the color reproduction range of blue color was extended (i.e., the A value was larger) as compared to that of the conventional ink set (Comparative Example 1). Thus, high density cyan color could be expressed which was comparable to the cyan color expressed by the conventional ink set (Comparative Example 1). Further, since blue color can be expressed by use of the blue ink alone, a landing error due to superposition was not caused in a part printed in blue color, thereby achieving sharp printing.

Further, in each of Examples 7 to 11, since the green ink having a lightness L* of 60 or less was employed, the color reproduction range of green color was extended (i.e., the A value was larger) as compared to that of the conventional ink set (Comparative Example 7). Thus, high density cyan color could be expressed which was comparable to the cyan color expressed by the conventional ink set (Comparative Example 7). Further, since green color can be expressed by use of the green ink alone, a landing error due to superposition was not caused in a part printed in green color, thereby achieving sharp printing.

In each of Comparative Examples 2 and 3, cyan color could be expressed at the same level as that expressed by the conventional ink set (Comparative Example 1) since the normal cyan ink having a lightness L* of less than 60 was employed. In addition, the color reproduction range of blue color was extended (i.e., the A value was larger) as compared to that of the conventional ink set (Comparative Example 1) since the blue ink was employed in addition to the normal cyan ink. However, contrary to the Examples, the graininess of cyan color was noticeable in a low density printed part.

In each of Comparative Examples 4 to 6, the graininess of cyan color was reduced in a low density printed part since the light cyan ink having a lightness L* of 60 or more was employed. However, since the blue ink was not employed, the color reproduction range of blue color was narrower (i.e., the A value was smaller) as compared to that of the conventional ink set (Comparative Example 1), and the color reproduction range of high density cyan color was not satisfactory.

In each of Comparative Examples 8 and 9, the graininess of cyan color was reduced as compared to that of the conventional ink set (Comparative Example 7) since the light cyan ink having a lightness of 60 was employed. However, since the green ink was not employed, high density green color could not be expressed since the green ink was not employed. In addition, expression of the high density cyan color was not satisfactory. Thus, the ink sets of Comparative Examples 8 and 9 are practically problematic.

As has been described above, the ink sets of Examples 1 to 6 were superior to the ink sets of Comparative Examples 1 to 6 in reducing the graininess of cyan color in a low density printed part without reducing the color reproduction range of cyan color and also in extending the color reproduction range of blue color. Similarly, the ink sets of Examples 7 to 11 are superior to the ink sets of Comparative Examples 7 to 9 in reducing the graininess of cyan color in a low density printed part and in extending the color reproduction range of green color.

Example 12 and Comparative Example 10

(1) Preparation of Inks and Configuration of Ink Sets

The same procedure as in Example 1 was repeated to prepare a yellow ink, a light magenta ink, a red ink, a light cyan ink 1, a blue ink 2 and a green ink 1 each having the ink composition shown in Table 3. The ink set of Example 12 was configured by use of these six inks.

A commercial ink set was employed as the ink set of Comparative Example 10. This commercial ink set is a three color ink set for a digital multifunction device equipped with an ink-jet printer (MFC-5200J, product of Brother Industries, Ltd.) which comprise a yellow ink (LC600Y), a magenta ink (LC600M) and a cyan ink (LC600C).

TABLE 3

| | | Yellow ink | Light magenta ink | Red ink | Light cyan ink 1 | Blue ink 2 | Green ink 1 |
|---|---|---|---|---|---|---|---|
| Ink composition (wt %) | C. I. Acid Red 52 | — | 1.6 | — | — | — | — |
| | C. I. Direct Red 254 | — | — | 2.5 | — | — | — |
| | C. I. Direct Blue 199 | — | — | — | 2.0 | — | — |
| | C. I. Acid Blue 112 | — | — | — | — | 6.0 | — |
| | C. I. Direct Yellow 86 | 0.4 | — | — | — | — | — |
| | C. I. Direct Yellow 132 | 1.6 | — | — | — | — | — |
| | C. I. Acid Green 3 | — | — | — | — | — | 6.0 |
| | Glycerin | 27.0 | 27.0 | 27.0 | 27.0 | 27.0 | 27.0 |
| | Dipropylene glycol-n-propyl ether | 2.0 | 2.0 | 2.0 | 2.0 | 2.0 | 2.0 |
| | Water | 69.0 | 69.4 | 68.5 | 69.0 | 65.0 | 65.0 |
| Colorimetric system | L* | — | 51 | 32 | 60 | 42 | 49 |
| | C* | — | 84 | 80 | 68 | 74 | 77 |
| | h [°] | — | 355 | 33 | 230 | 272 | 189 |

(2) Determination of L*, C* and h

Each of the inks was measured for L*, a* and b* similarly to Example 1, and C* and h were calculated. The results are shown in Table 3.

(3) Evaluation of Ink Sets

As in the evaluation of ink set in Example 1, print pattern samples for color reproducibility evaluation were printed by use of the ink sets of Example 12 and Comparative Example 10. The print pattern samples contain patches having various hues.

In this case, the number of attachable ink cartridges is four in the ink-jet printer employed for the printing. Thus, upon printing the print pattern samples of the ink set of Example 12, the six inks were filled into respective ink cartridges, and these cartridges were divided into the following two groups for convenience. Subsequently, the printing was performed for each of the two groups.

First group: red ink, yellow ink, green ink 1 and light cyan ink 1.

Second group: light cyan ink 1, blue ink 2, light magenta ink and red ink.

In this ink division method, four out of the six inks were selected in the order of increasing hue angle h to form the first group. The second group includes the ink having the largest hue angle h among the first group inks, two inks having a hue angle h larger than that of the first group inks, and the ink having the smallest hue angle h among the first group inks.

Further, a printer driver capable of printing the patch patterns having various hues was created to perform printing.

The obtained print pattern samples were measured for a* and b* as in above, and color reproduction areas were determined for L*=40, 50, 60, 70 and 80.

Figure 2:
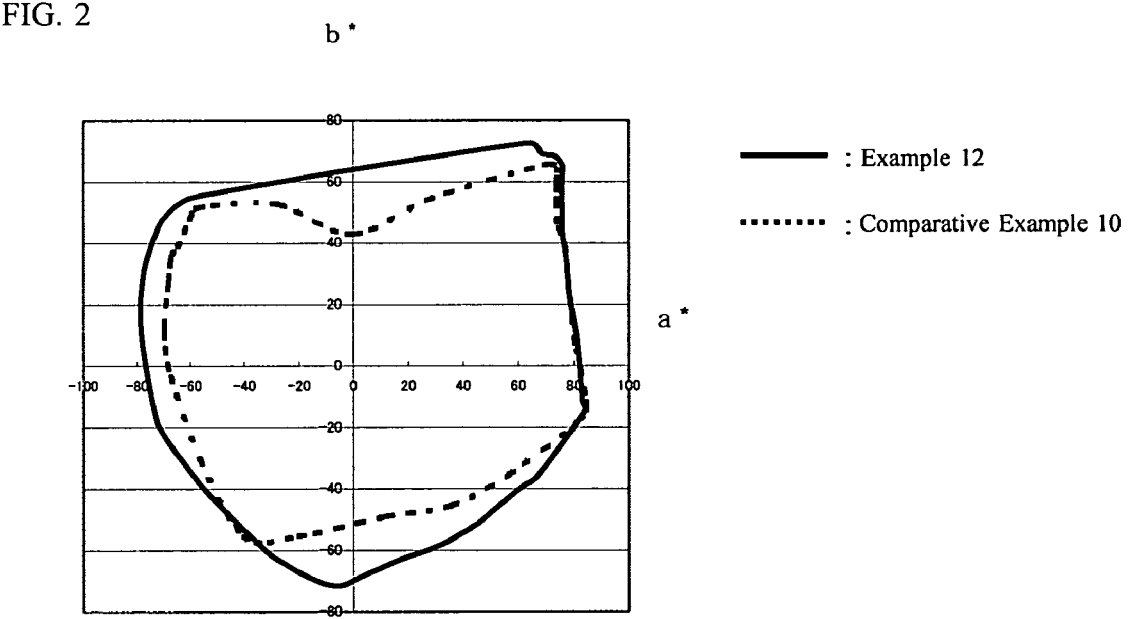
FIG. 2 is a graph showing the color reproduction range at lightness L*=50 for Example 12 and Comparative Example 10.
Figure 3:
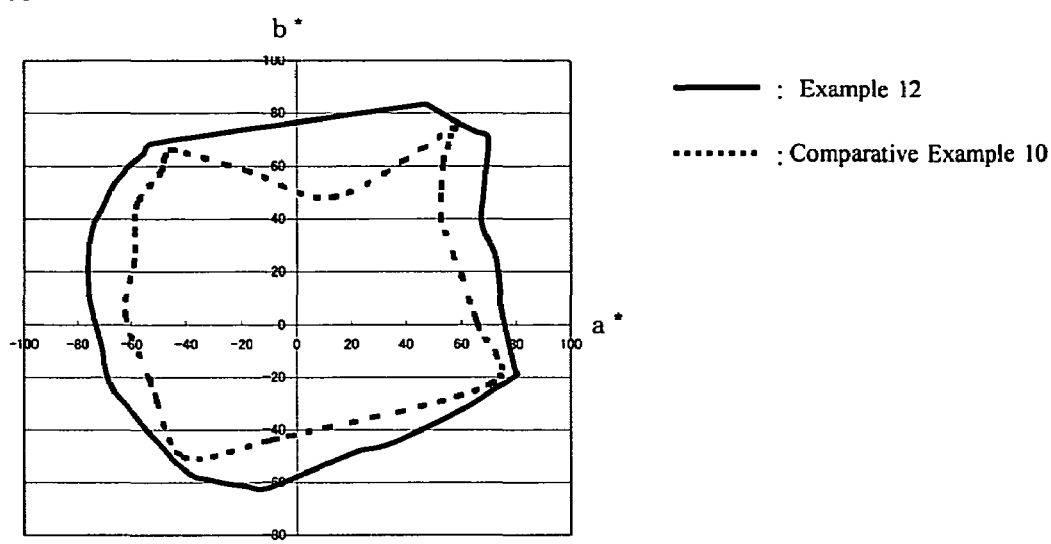
FIG. 3 is a graph showing the color reproduction range at lightness L*=60 for Example 12 and Comparative Example 10.
Figure 4:
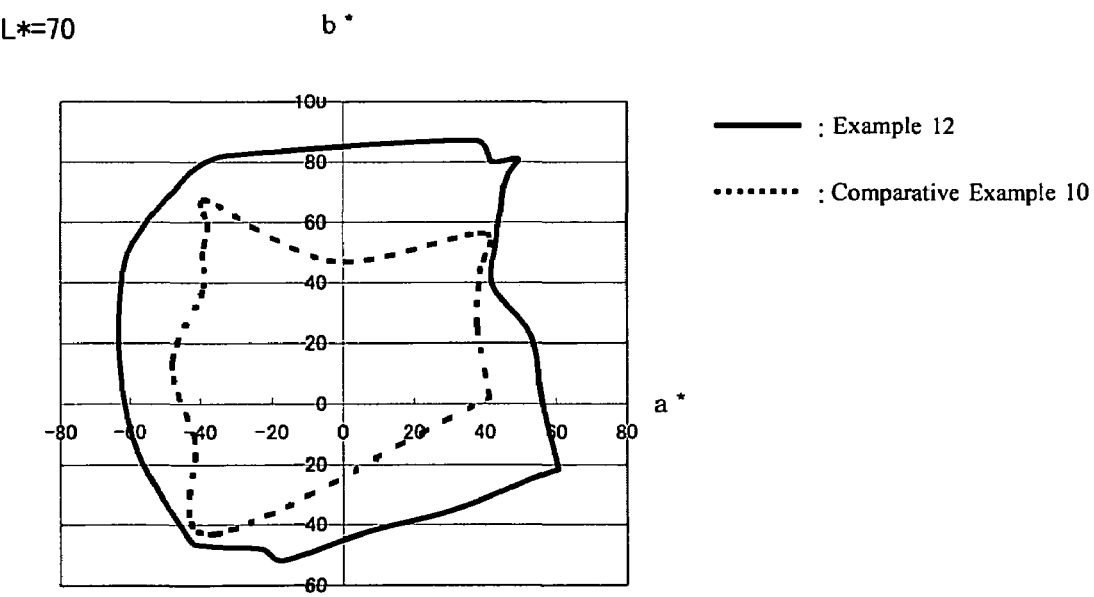
FIG. 4 is a graph showing the color reproduction range at lightness L*=70 for Example 12 and Comparative Example 10.
Figure 5:
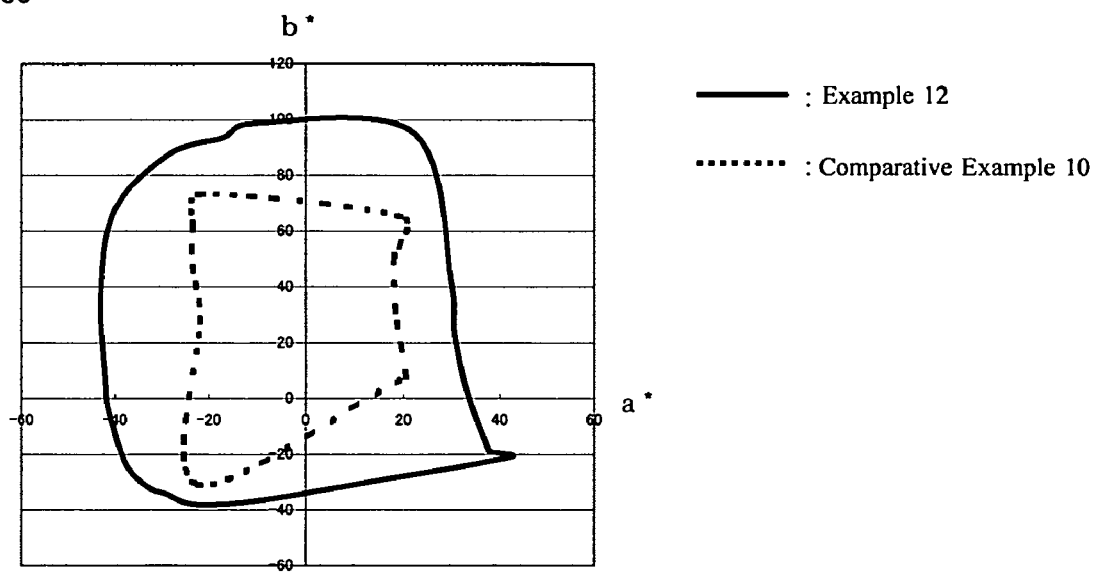
FIG. 5 is a graph showing the color reproduction range at lightness L*=80 for Example 12 and Comparative Example 10.

The ratio of the color reproduction area of Example 12 to that of Comparative Example 10 at the same L* value was determined, and the obtained results were evaluated by use of the following criteria. The results are shown in Table 4. In addition, FIGS. 1 to 5 show graphs of the color reproduction range of Example 12 and Comparative Example 10 for each L* value.

A: More than 110%.
B: More than 105% and 110% or less.
C: More than 90% and 105% or less.
D: 90% or less.

TABLE 4

|  |  | Example 12 | Comparative Example 10 |
|---|---|---|---|
| Ink set configuration | Yellow ink | Yellow ink | LC600Y |
|  | Magenta ink | Light magenta ink | LC600M |
|  | Red ink | Red ink | — |
|  | Cyan ink | Light cyan ink 1 | LC600C |
|  | Blue ink | Blue ink 2 | — |
|  | Green ink | Green ink 1 | — |
| L* = 40 | Color reproduction area | 19078 | 12592 |
|  | Area ratio to Comparative Example | 151.5% | — |
|  | Evaluation | A | — |
| L* = 50 | Color reproduction area | 21805 | 19168 |
|  | Area ratio to Comparative Example | 113.8% | — |
|  | Evaluation | A | — |

TABLE 4-continued

|  |  | Example 12 | Comparative Example 10 |
|---|---|---|---|
| L* = 60 | Color reproduction area | 22910 | 16124 |
|  | Area ratio to Comparative Example | 142.1% | — |
|  | Evaluation | A | — |
| L* = 70 | Color reproduction area | 17004 | 8526 |
|  | Area ratio to Comparative Example | 199.4% | — |
|  | Evaluation | A | — |
| L* = 80 | Color reproduction area | 11873 | 5149 |
|  | Area ratio to Comparative Example | 230.6% | — |
|  | Evaluation | A | — |

As can be seen from the results in Table 4, the ink set of Example 12 has the color reproduction area significantly enlarged as compared to the ink set of Comparative Example 10.

The water-based ink set for ink-jet recording of the present invention enables the reduction of graininess in a low density printed part and the extension of a color reproduction range and thus is useful when a color image is reproduced by a printer for ink-jet recording.

The entire disclosures of the specifications, summaries, claims, drawings and abstracts of Japanese Patent Application No. 2004-370287 and Japanese Patent Application No. 2004-370288, both filed on Dec. 21, 2004, are hereby incorporated by reference.

What is claimed is:

1. A water-based ink set for ink-jet recording comprising a cyan ink and a blue ink,
    wherein the cyan ink is a light cyan ink having a lightness (L*) of about 60 or more in the L*a*b* colorimetric system; and
    wherein the light cyan ink has a hue angle (h) in a range of from about 215° to about 255° in the L*a*b* colorimetric system.

2. The water-based ink set for ink-jet recording according to claim 1,
    wherein a normal cyan ink having a lightness (L*) of less than about 60 in the L*a*b* colorimetric system is not included in the ink set.

3. The water-based ink set for ink-jet recording according to claim 2, wherein the light cyan ink has the lightness (L*) in a range of from about 60 to about 85 in the L*a*b* colorimetric system.

4. The water-based ink set for ink-jet recording according to claim 1,
    wherein the light cyan ink has a chroma (C*) in a range of from about 40 to about 70 in the L*a*b* colorimetric system.

5. The water-based ink set for ink-jet recording according to claim 1,
    wherein the blue ink has a lightness (L*) of about 45 or less in the L*a*b* colorimetric system.

6. The water-based ink set for ink-jet recording according to claim 5,
    wherein the blue ink has the lightness (L*) in a range of from about 35 to about 45 in the L*a*b* colorimetric system.

7. The water-based ink set for ink-jet recording according to claim 1, wherein the blue ink has a hue angle (h) in a range of from about 270° to about 285° in the L*a*b* colorimetric system.

8. The water-based ink set for ink-jet recording according to claim 1,
wherein the blue ink has a chroma (C*) in a range of from about 70 to about 80 in the L*a*b* colorimetric system.

9. The water-based ink set for ink-jet recording according to claim 1, further comprising a yellow ink and/or a magenta ink and/or a black ink.

10. The water-based ink set for ink-jet recording according to claim 1, further comprising a green ink.

11. The water-based ink set for ink-jet recording according to claim 10,
wherein the green ink has a lightness (L*) of about 60 or less in the L*a*b* colorimetric system.

12. The water-based ink set for ink-jet recording according to claim 11,
wherein the green ink has the lightness (L*) in a range of from about 35 to about 60 in the L*a*b* colorimetric system.

13. The water-based ink set for ink-jet recording according to claim 10,
wherein the green ink has a hue angle (h) in a range of from about 175° to less than about 215° in the L*a*b* colorimetric system.

14. The water-based ink set for ink-jet recording according to claim 10,
wherein the green ink has a chroma (C*) in a range of from about 60 to about 80 in the L*a*b* colorimetric system.

15. The water-based ink set for ink-jet recording according to claim 10, further comprising a yellow ink and/or a magenta ink and/or a black ink.

16. A water-based ink set for ink-jet recording comprising a cyan ink and a green ink,
wherein the cyan ink is a light cyan ink having a lightness (L*) of about 60 or more in the L*a*b* colorimetric system.

17. The water-based ink set for ink-jet recording according to claim 16,
wherein a normal cyan ink having a lightness (L*) of less than about 60 in the L*a*b* colorimetric system is not included in the ink set.

18. The water-based ink set for ink-jet recording according to claim 17,
wherein the light cyan ink has the lightness (L*) in a range of from about 60 to about 85 in the L*a*b* colorimetric system.

19. The water-based ink set for ink-jet recording according to claim 16,
wherein the light cyan ink has a hue angle (h) in a range of from about 215° to about 255° in the L*a*b* colorimetric system.

20. The water-based ink set for ink-jet recording according to claim 16,
wherein the light cyan ink has a chroma (C*) in a range of from about 40 to about 70 in the L*a*b* colorimetric system.

21. The water-based ink set for ink-jet recording according to claim 16,
wherein the green ink has a lightness (L*) of about 60 or less in the L*a*b* colorimetric system.

22. The water-based ink set for ink-jet recording according to claim 21,
wherein the green ink has the lightness (L*) in a range of from about 35 to about 60 in the L*a*b* colorimetric system.

23. The water-based ink set for ink-jet recording according to claim 16,
wherein the green ink has a hue angle (h) in a range of from about 175° to less than about 215° in the L*a*b* colorimetric system.

24. The water-based ink set for ink-jet recording according to claim 16,
wherein the green ink has a chroma (C*) in a range of from about 60 to about 80 in the L*a*b* colorimetric system.

25. The water-based ink set for ink-jet recording according to claim 16, further comprising a yellow ink and/or a magenta ink and/or a black ink.

26. An ink-jet recording method employing the water-based ink set according to claim 1.

27. An ink-jet recording method employing the water-based ink set according to claim 10.

28. An ink-jet recording method employing the water-based ink set according to claim 16.

* * * * *